(12) United States Patent
Fu et al.

(10) Patent No.: US 10,904,346 B2
(45) Date of Patent: Jan. 26, 2021

(54) WEIGHTED DIGITAL IMAGE OBJECT TAGGING

(71) Applicant: INTERNATIONAL BUSINESS MACHINES CORPORATION, Armonk, NY (US)

(72) Inventors: Yan Bin Fu, Ningbo (CN); Wen Wang, Beijing (CN); Shuang Yin Liu, Beijing (CN); Yi Wu, Ningbo (CN); Qing Jun Gao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/207,462

(22) Filed: Dec. 3, 2018

(65) Prior Publication Data
US 2020/0177688 A1    Jun. 4, 2020

(51) Int. Cl.
*G06K 9/00* (2006.01)
*H04L 29/08* (2006.01)
(Continued)

(52) U.S. Cl.
CPC ............ *H04L 67/22* (2013.01); *G06F 16/535* (2019.01); *G06F 16/54* (2019.01);
(Continued)

(58) Field of Classification Search
CPC ..... H04L 67/22; H04L 67/306; G06F 16/535; G06F 16/5866; G06F 16/54; G06F 16/9535; G06F 16/2457; G06F 16/24573; G06F 16/24575; G06F 16/24578; G06F 16/58; G06F 16/583; G06F 16/5838; G06F 16/5846; G06F 16/5854; G06F 16/5862; G06F 16/95; G06F 16/9536;
(Continued)

(56) References Cited

U.S. PATENT DOCUMENTS 8,136,028 B1 * 3/2012 Loeb .................... G06F 40/134
715/205
9,008,465 B2   4/2015 Goturk et al.
(Continued)

FOREIGN PATENT DOCUMENTS

WO    2010141637 A1    12/2010
WO    2013184073 A1    12/2013

OTHER PUBLICATIONS

Sharma, V., et al., "Automatic tagging and retrieval of E-Commerce products based on visual features", Proceedings of VAACL-HLT (2016), pp. 22-28.
(Continued)

*Primary Examiner* — Jose L Couso
(74) *Attorney, Agent, or Firm* — Michael O'Keefe; Matthew M. Hulihan; Heslin Rothenberg Farley & Mesiti PC

(57) ABSTRACT

Weight image object tagging includes acquiring digital images based on a user browsing webpages, automatically tagging the digital images based on weighting individual image objects, where automatically tagging a digital image of the digital images is based on a relative weighting between objects recognized from that digital image, and building a user preference profile based on recurrences of tags across the digital images.

20 Claims, 9 Drawing Sheets

(51) Int. Cl.
*G06K 9/46* (2006.01)
*G06K 9/62* (2006.01)
*G06Q 30/06* (2012.01)
*G06F 16/535* (2019.01)
*G06F 16/9535* (2019.01)
*G06F 16/54* (2019.01)
*G06F 16/58* (2019.01)

(52) U.S. Cl.
CPC ...... *G06F 16/5866* (2019.01); *G06F 16/9535* (2019.01); *G06K 9/46* (2013.01); *G06K 9/6202* (2013.01); *G06K 9/6256* (2013.01); *G06Q 30/0631* (2013.01)

(58) Field of Classification Search
CPC .... G06F 16/355; G06F 16/904; G06F 16/313; G06F 16/358; G06F 16/34; G06F 16/353; G06K 9/46; G06K 9/6202; G06K 9/6256; G06K 9/00664; G06K 9/6201; G06K 9/6254; G06K 9/6259; G06K 9/6262; G06K 9/6267; G06K 9/6297; G06K 9/66; G06K 9/00577; G06K 9/00624; G06K 9/3241; G06K 9/00288; G06K 9/00221; G06K 9/00263; G06K 9/00677; G06K 9/62; G06K 9/6215; G06K 9/6218; G06K 2209/17; G06K 2209/23; G06K 2209/27; G06K 9/00201; G06K 9/00671; G06K 9/4628; G06K 9/6271; G06Q 30/0251; G06Q 30/0255; G06Q 30/0271; G06Q 30/0623; G06Q 30/0625; G06Q 30/02; G06Q 30/0269; G06Q 50/01; Y10S 707/99944; Y10S 707/99945; Y10S 707/99933; Y10S 707/99932; Y10S 707/99934; Y10S 707/99935; G06N 3/02; G06N 3/084; G06N 3/086; G06N 3/088; G06N 3/04; G06N 3/0454; G06N 3/0481; G06N 3/08–088; G06T 2207/20084; G06T 2207/20081
See application file for complete search history.

(56) References Cited

U.S. PATENT DOCUMENTS

| | | | |
|---|---|---|---|
| 9,229,954 | B2 | 1/2016 | Wu et al. |
| 9,317,533 | B2 | 4/2016 | Yang et al. |
| 9,323,786 | B2* | 4/2016 | Epstein .................. G06F 16/58 |
| 2003/0074369 | A1* | 4/2003 | Schuetze ............... G06F 16/355 |
| 2012/0076367 | A1* | 3/2012 | Tseng .................... G06F 16/583 |
| | | | 382/118 |
| 2012/0239506 | A1* | 9/2012 | Saunders ............... G06Q 30/02 |
| | | | 705/14.67 |
| 2013/0262588 | A1* | 10/2013 | Barak ................ G06K 9/00221 |
| | | | 709/204 |
| 2014/0037195 | A1* | 2/2014 | Lin ....................... G06F 16/583 |
| | | | 382/155 |
| 2014/0279039 | A1 | 9/2014 | Systrom et al. |
| 2014/0310304 | A1 | 10/2014 | Bhardwaj et al. |
| 2016/0092959 | A1* | 3/2016 | Gross ................. G06K 9/00671 |
| | | | 705/26.62 |
| 2018/0197223 | A1* | 7/2018 | Grossman ............ G06K 9/4619 |
| 2019/0073346 | A1* | 3/2019 | Svendsen .............. G06F 40/169 |
| 2020/0151448 | A1* | 5/2020 | Lin ..................... G06K 9/00201 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

WEIGHTED DIGITAL IMAGE OBJECT TAGGING

BACKGROUND

With developments in web platforms such as online shopping platforms, there is an increase in the number of users using web technology for browsing images that reflect their preferences. Webpages commonly use digital images for robust visual communication of objects. Despite the fact that each image can carry an extensive amount of information and detail, particularly about objects being displayed, images tend to be more easily understood by viewers. Sometimes users expect to see images, for instance when shopping online storefronts for consumer goods. Beyond e-commerce sites, digital images play an important role as a data carrier in almost all other types of websites, including search engines and social network sites. Images viewed by users when browsing websites are usually tagged by the webpage source with pre-defined tags. User browsing behavior is typically logged/represented using those pre-defined tags.

SUMMARY

Shortcomings of the prior art are overcome and additional advantages are provided through the provision of a computer-implemented method. The method acquires digital images based on a user browsing webpages. The method automatically tags the digital images based on weighting individual image objects. Automatically tagging a digital image of the digital images is based on a relative weighting between objects recognized from that digital image. The method also builds a user preference profile based on recurrences of tags across the plurality of digital images.

Further, a computer system is provided that includes a memory and a processor in communication with the memory, wherein the computer system is configured to perform a method. The method acquires digital images based on a user browsing webpages. The method automatically tags the digital images based on weighting individual image objects. Automatically tagging a digital image of the digital images is based on a relative weighting between objects recognized from that digital image. The method also builds a user preference profile based on recurrences of tags across the plurality of digital images.

Yet further, a computer program product including a computer readable storage medium readable by a processing circuit and storing instructions for execution by the processing circuit is provided for performing a method. The method acquires digital images based on a user browsing webpages. The method automatically tags the digital images based on weighting individual image objects. Automatically tagging a digital image of the digital images is based on a relative weighting between objects recognized from that digital image. The method also builds a user preference profile based on recurrences of tags across the plurality of digital images.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
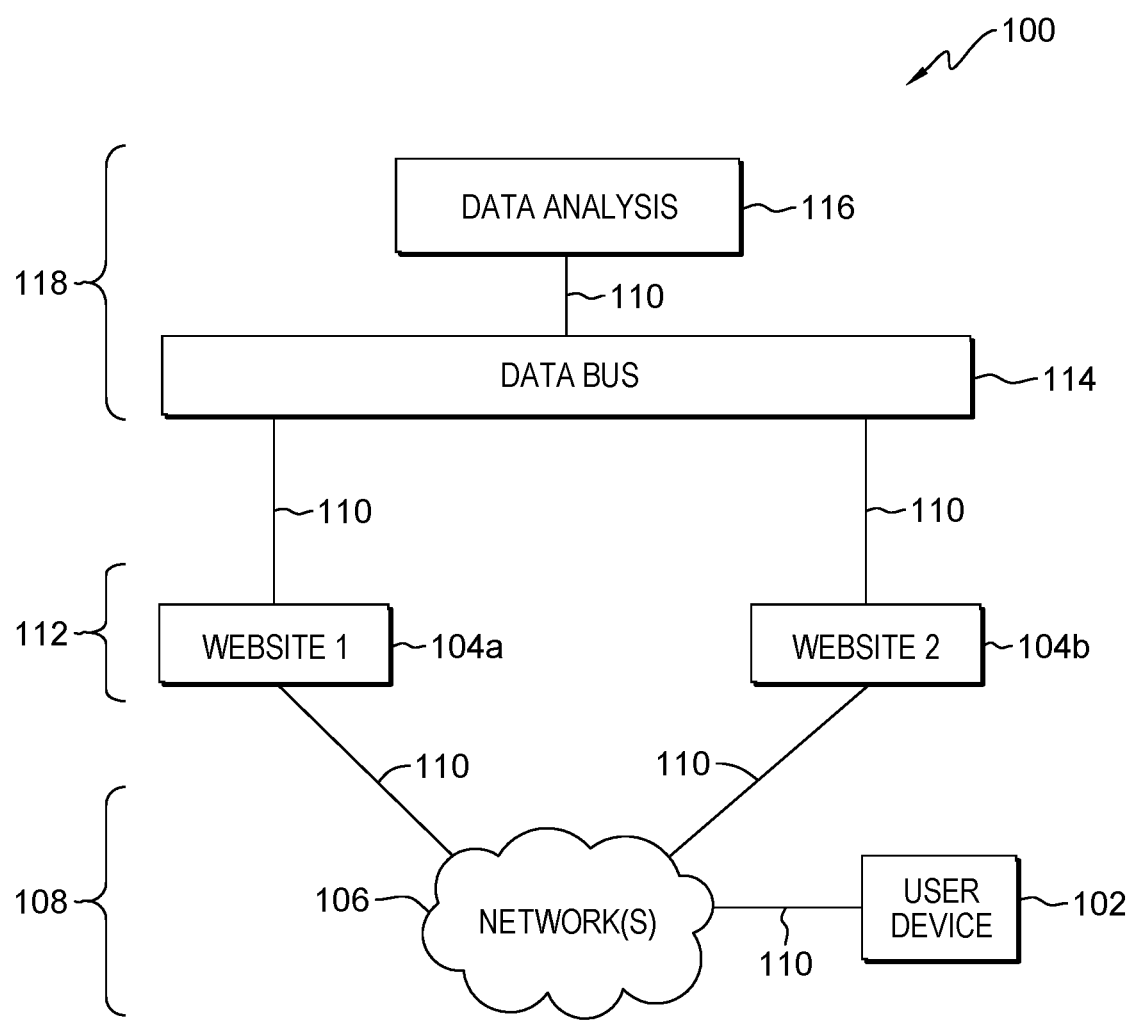
FIG. 1 depicts an example environment to incorporate and use aspects described herein.

Conventionally, images fed by a server to a user's browser are tagged with tags pre-defined on the server-side, e.g. by the web developer/designer or image provider, for instance. Image processing based on these predefined tags can be useful, though it is not without challenges. Predefined tags are usually drawn from a limited set of predefined tags and fail to present a complete description of the image. They tend to not accurately and richly represent the user's browsing behavior, fail to offer flexibility, and are often times applied manually by an administrator or site designer, and therefore subject to error and/or improper human influence.

Described herein are approaches for tagging digital images based on weighting recognized image objects. As users browse webpages, the digital images they view can be tracked. Over time, user preferences can be ascertained based on recurrences of the auto-generated tags applied to the images. Approaches use image object recognition technology and object weighting to tag images, rather than relying on pre-defined tags, in analyzing images that users have browsed. This can help mine potential user demand and preference via this analysis. Aspects can automatically understand the content of the browsed images using intelligent recognition in order to extract the characteristics and properties of each image, for instance the objects in the images, using evaluation factors such as kind, color, usage, shape, object source, and so on. These factors can be weighted and applied to the different detected objects in the images to attach different levels of weight and importance/influence those objects have on the extracted core points from the images. Factors such as object size, position, and focus can contribute to the determination of how important that object is in representing properties/preference in which the user is interested.

Approaches described herein can provide identification of objects in images, auto-generation of image tags without pre-defined structure, standardization of image analysis across different platforms, and analysis of user preference with auto-generated tags in big data environments.

As an overview, a process collects images from different webpages/sites as a user browses those pages and automatically detects image objects in those images. The process builds an object weight calculation model based on factors, for instance object core point, object scale, and other factors. The process identifies objects that are weighted highly by the model and performs a deeper analysis of those objects to build a rounded and structure-free description of each object. Tags are auto-generated and applied to the images based on that analysis. The user's behavior with respect to image viewing and browsing is tracked across images and over time. The auto-generated and applied tags are used to analyze user preference and potential demand, for instance for product preferences, as the number of data points grows.

Aspects can be implemented in an example three-layered architecture environment, with a layer for image acquisition, a layer for image data analysis, and a layer for determining image object weights. FIG. 1 depicts an example environment 100 to incorporate and use aspects described herein.

A user interacts with user device 102, such as a computer system running a web browser, to access websites 104a, 104b across network(s) 106 and communications link(s) 110. The user device 102 may represent one or more user devices that the user uses to access the websites, for instance to browse products offered for sale on webpages of these sites. 'Websites' encompasses both traditional web page offerings as well as other web-application offerings, such as social networks (such as Facebook®, a registered trademark of Facebook, Inc., Menlo Park, Calif., U.S.A.; Pinterest®, a registered trademark of Pinterest, Inc., San Francisco, Calif., U.S.A.), image posting platforms (such as Instagram®, a registered trademark owned by Facebook, Inc.), chat platforms, and other web platforms, including platforms commonly offered via mobile applications.

Network(s) 106 include one or more local area and/or wide area networks, such as the Internet. Communication links 110 may be or include any appropriate wired or wireless communication links for communicating data, including cellular, ethernet, Wi-Fi, and/or other types of connections.

Layer 108 in FIG. 1 denotes the data access layer by which the user accesses the digital images for viewing. Layer 112 denotes a data provider layer that provides the digital images to the user, and is the layer at which the server(s) and other facilities providing the webpages and web content (e.g. digital images) sit. Websites 104a, 104b could each represent an online shop provided by respective database, file, web, and/or application server(s).

Layer 118 denotes the data analysis layer. The data bus 114 is a facility though which data analysis service 116 receives indications of user-browsed/accessed images. The indications could be/include the images themselves, or be identifiers of the images such that service 116 can separately acquire the images. In this example, the indications/images are passed through data bus 114 from the websites 104a, 104b across communication links 110. These sites have knowledge about what images they served to user device(s) 102. In alternative embodiments, the indications/images are provided directly from the user device(s) 102, for instance by an application, client, or service running thereon.

The data analysis service 116 can perform processes described herein. In examples, it is hosted on a cloud and/or other computer system(s) remote from websites 104a, 104b, and user device(s) 102, though it could alternatively be hosted by a website 104a, 104b server itself. In yet another example environment, data analysis 116 executes directly on user device(s) 102 based on images device(s) 102 has retrieved from user browser activity.

Figure 2:
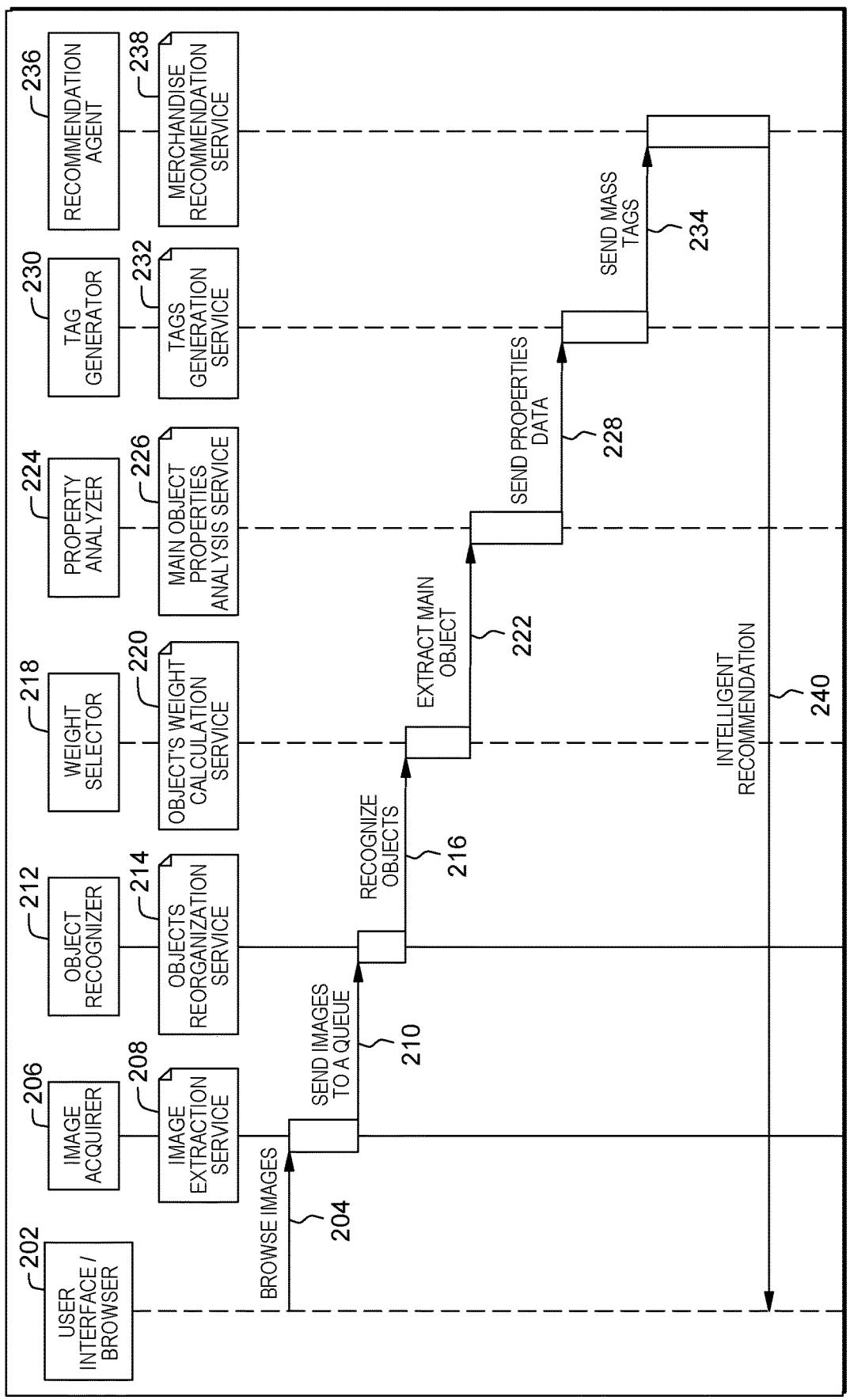
FIG. 2 depicts an example conceptual flow for weighted image tagging and preference profile building, in accordance with aspects described herein.

FIG. 2 depicts an example conceptual flow for weighted image tagging and preference profile building, in accordance with aspects described herein. The flow depicts collecting, recognizing, calculating, and analyzing images. 202 represents a user interface/browser that a user uses to access and browse 204 images. An image acquirer component 206 executes an image extraction service 208 against the user's browsing activity 204 to extract images from the user's browser activity. The image acquirer sends 210 those images to a queue of an object recognizer 212 executing an objects recognition service 214 that recognizes objects. The object recognizer 212 sends 216 the recognized objects, or indications thereof, to a weight selector component 218 executing an object weight calculation service 220. This service applies weights to the recognized objects. This identifies the 'main' recognized objects. The weight selector 218 sends 222 the main objects, or indications thereof, to a property analyzer 224. The property analyzer 224 runs a main object properties analysis service 226 that identifies properties of each object. The property analyzer 224 sends 228 the properties data to a tag generator 230. The generator 230 runs a tag generation service 232 to auto-generate tags corresponding to the identified properties of the main objects. The images can be tagged with these auto-generated tags. It is noted that 'tagged' need not necessarily mean that the tags are applied to the digital image or metadata that is part of the digital image. Tagging in this case can be an indication or association, where, for a given digital image, the image is tagged in the sense that the auto-generated tags are indicated as applying or corresponding to the image and/or specific content thereof.

The tag generator sends 234 mass tags to a recommendation agent 236 that runs a merchandise recommendation service 238. The merchandise recommendation service can recommend specific or general merchandise in which the user might be interested, based on the user's browsing habits as informed by the browsed images. The recommendation agent can therefore send an intelligent recommendation 240 back to the user. The recommendation can be in any form, for instance an electronic communication (email, text, phone call, in-browser advertisement, app notification, etc.) or a physical mailing, e.g. as a coupon or physical advertisement, as examples. The communication/recommendation could be delivered as part of an incentive, such as a coupon, rebate, or reward.

Aspects of FIG. 2 can be performed on an image-by-image basis. For instance, object recognition, weighting, property analysis, and tag generation may be performed against each image to generate image-specific tags. The group of tags across images can be collected and analyzed as described herein for user preference profile building to inform, e.g., recommendations.

Additionally, the aspects of FIG. 2 can be performed by any desired computer system(s), such as cloud or remote backend systems, user device(s), and/or a combination of the two.

In the context of online shopping, many websites rely on images for merchandise display. A user navigates through several different web pages and assesses the products being offered for sale. As part of comparison shopping, color and size selection, and other activities, the user typically views groups of images with similar characteristics in terms of the objects being presented therein. User preferences might therefore be ascertained by acquiring and analyzing those digital images based on the user browsing the webpages.

Different platforms typically have different rules to categorize and tag the images and digital image objects depicted therein. Since different websites can categorize and tag images differently, it can be hard to integrate image properties across sites and build a standard for extracting information about those images based on the tags delivered with the images. Consequently, aspects can use an analysis service as described above to implement a uniform analysis of the images and standardize the content extraction and user preference building therefrom.

Analyzing the image data of an image can automatically generate tags based on the content of the image. Initially, object recognition technology is applied to extract the objects in a given image. An image is processed using object recognition software and objects in the digital image are recognized. Any appropriate object recognition technology can be used—typically implemented as software executing on one or more computer system(s). The delivery of the recognition processing can vary, for instance it could be via a host platform performing the recognition and/or as part of application programming interface calls to invoke recognition processing against an image. The basic objects and information from the image may be recognized initially. Then, object(s) recognized from the image can be analyzed to identify specific properties of those objects. Tags can then be generated for the image as explained herein.

Figure 3:
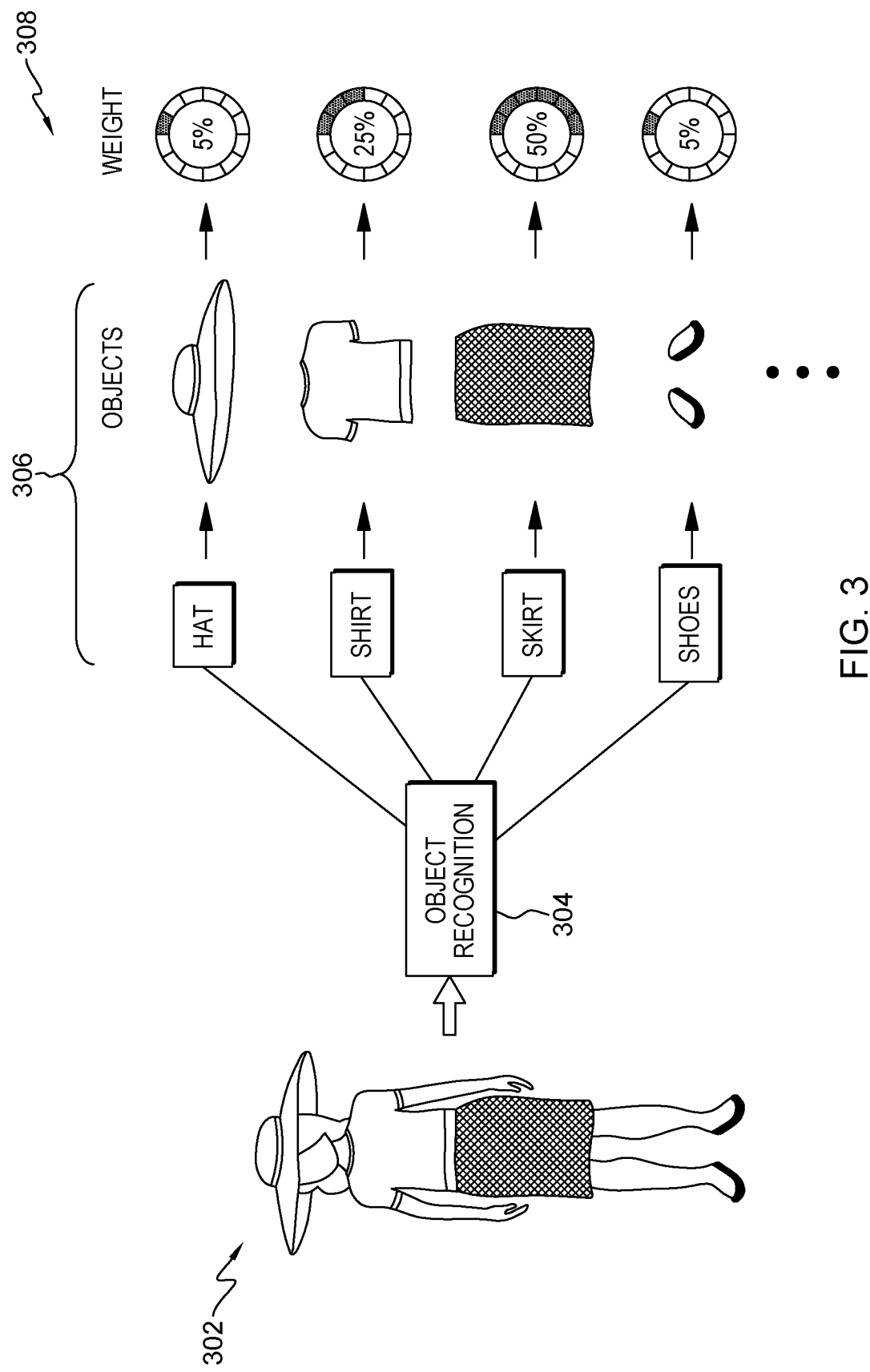
FIG. 3 depicts an example of digital image object recognition and weighting, in accordance with aspects described herein.

In some embodiments, not all recognized objects are deeper-analyzed for their properties. Instead, recognized objects can be weighted to indicate their significance to the image. Then, only objects weighed above some threshold may be analyzed. FIG. 3 depicts an example of digital image object recognition and weighting, in accordance with aspects described herein. Image 302 depicts a person wearing a hat, shirt, skirt, and shoes. Object recognition 304 applied against the image 302 recognizes these (and other) objects from the image. Recognized objects 306 include the hat, shirt, skirt, and shoes, among others. Weights 308 are then assigned to each of the recognized objects, and the objects may be weighted relative to each other as described herein. Here, the skirt is weighted highest (50%) of the four objects, followed by the shirt at 25%, and hat and shoes each at 5%. The person (wearing the hat, shirt, skirt and shoes), background objects, superimposed text, etc. are all examples of other objects that may be recognized and weighted as well. In some embodiments, the weights of all recognized object sum to 100%.

Weighting the objects may begin with a definition of factors. Example factors are object core point, object scale, focal point, object color accuracy, and object color luminance, though any desired factors could be used. The respective weights assigned to the recognized objects in the digital image may be a function of at least scores of those factors. Those scores can be part of a weighted sum to indicate the weighting of the object. An object's scores for at least the factors 'core point', 'object scale' and 'focal point' could be determined relative to the other recognized objects of the image. The score of the core point factor for an object could be a measurement of the likelihood that the object is, or the contribution that object has to, the core point of the image. The score of the object scale factor for an object could be a percentage of a total area that object consumes in the image. The total area could be the total area of the image, or a total area consumed by foreground objects (of which the object is one) of the image, for instance. The score of the focal point factor for an object could be a percentage that the object is, or the contribution that object has to, the focus of the image. It is seen that an object's scores for at least these factors will be based on the other objects, for instance the size of one object will affect the object scale score of other objects. Thus, the weight assigned to an object is at least in part relative to other objects of the image.

With the factors defined, each object is assigned a weight. An example model for weighting is as follows, using five factors, such as those above.

Define a factor vector X as: $X(x_0, x_1, x_2, x_3, x_4, x_5)$, where each $x_N$ represents a factor;

Define a weight vector W as: $W(w_0, w_1, w_2, w_3, w_4, w_5)$. These are the individual weights to apply to corresponding scores for the above five factors of the factor vector. $w_0$ is the weight of factor $x_1$, $w_1$ is the weight of factor $x_2$, and so on Define total weight, z, as: $z = x_0 w_0 + w_1 x_1 + w_2 x_2 + \ldots + w_5 x_5$. Each recognized object has assigned a total weight, z. It is seen that the weight assigned to a recognized object includes a weighted sum of the scores of the factors ($x_N$), i.e. weighted by their associated weights (the $w_N$). The z values for the hat, shirt, skirt, and shoes of FIG. 3 are 5%, 25%, 50%, and 5%, respectively.

Though any approach can be used to generate the weights for the different factors, in some examples the associated weight for each factor is determined using a neural network learning model. The neural network learning model can be trained from data that correlates user behavior/preferences to various factors across a collection of image objects. A model (such as the z model above) is built and the weights—the w terms—can be calculated by feeding the training data collected from various platforms into the neural network model. The output of training the neural network can be the weight factors, i.e. $w_0$, $w_1$, etc., for each factor considered part of the model. In some embodiments, factors which, based on the training, are weighted below a threshold may be discarded as insignificant, if desired.

In some examples, the factors and/or weights are universally applicable to users, though in other examples, the factors and/or weights are determined specific for each user or each of several groups into which uses may be categorized. The model, factors, and factor weights may therefore be determined for applicability to any desired level of granularity.

After the objects are weighted, the process can select those objects with a weight greater than a threshold. An example threshold is 50%. The respective weights assigned to the recognized objects are compared against this threshold and any such recognized objects for which their respective assigned weight is higher than the threshold are identified. By this comparison, the 'most important' objects in the image are identified.

A deeper image analysis is performed on those image object(s) in order to identify their content and/or properties. For each of the objects identified above as being weighted above the threshold, this analysis is performed to find out more detailed information about the object. In an example of clothing objects, properties such as color, size, cut, fabric, seasons applicability (summer vs. winter clothing), and any other attributed characteristics are identified. Some such properties may be keywords associated with the object, for instance the word 'summer' with a pool object, and 'necklace' with earrings. When objects are associated with (e.g. worn by) other entities, such as a person, characteristics of the entity (gender, age, etc.) may be determined.

The properties of the objects weighted higher than the threshold can inform tags for automatically tagging the processed images. Thus, each image may be tagged based on the relative weighting between objects recognized from that digital image. For instance, if the object recognized and weighted highly is a skirt, a dataset can be referenced by a call or other function to retrieve tags correlated to a skirt (summer, female, warm, color, fabrics, brand, dress, etc.). For an example striped t-shirt, the tags returned could be (color(s) of the shirt, stripes, summer, fashion, and short-sleeved), as examples.

Libraries, databases, and/or other dataset(s) that associate objects and object properties to tags can be leveraged as part of this. A process can automatically tag digital images with generated tags corresponding to the identified properties of each of the identified recognized objects in those images. This automatic tagging can include generating the generated tags based on a dataset that correlates objects to tags. In examples where an image is delivered to the browser with tag(s) already applied (i.e. predefined tag(s) with which the site host already tagged the image), the automatically generated tags can be different/other than any such existing tags of the digital image.

Further aspects can track user image browsing over time with marked and free tags. In this regard, there may be a first image that is auto-tagged (marked) as described herein with three tags. Later, another viewed image may be processed to identify additional content in the other image, to identify additional tags, above the initial three marked tags for a given object. The additional tags from the second image are 'free' tags relative to the first image.

Over time as images are tagged in this manner, user preferences can be ascertained and a preference profile built. The tags applied to different objects for different users can be tracked. An example data structure for such tracking is shown in Table 1:

TABLE 1

| DateTime | User | Object | Tags | | | | |
|---|---|---|---|---|---|---|---|
| A | User1 | Object2 | tag | tag | tag | | |
| B | User2 | Object1 | tag | tag | tag | tag | tag |
| C | User2 | Object3 | tag | tag | | | |
| D | User3 | Object4 | tag | | | | |

The top row of Table 1 includes labels for the date/time of the browsing, the user, the object, and the tag(s) applied corresponding to that object. Tracking can be applied by user, object that the user viewed, and the tag(s) generated from properties of each such object. A user preference profile can be built by observing consistencies between objects explored, as described herein.

Tags can also associate objects frequently seen together. It may be observed that the user commonly views images depicting blue jeans paired with white shirts. By tagging according to aspects described herein, the generated tags can indicate an association between a collection of two (or more) objects recognized in a given digital image.

Notable points of this data collection and user preference analysis are that the tags can be free-structured, without reliance on any pre-defined tags. Date and time can be tracked for distinguishing user behavior and analyzing preference trends over time. User preference can be analyzed based on the data collected. In some embodiments, this is combined Natural Language Processing (NLP) knowledge. For example, tags 'black' and 'dark' can be processed to have similar meanings and therefore represent a correlation, overlap, or intersection.

Trends can inform how user preference changes over time, as reflected in the user's browsing habits. The user may have frequently browsed images of various red sport utility vehicles over the course of a few months but then, in the past 8 months, exclusively viewed blue economy sedans when browsing images of cars. This can inform that the user preference in vehicles, potentially for purchase, shifted from red to blue, larger to smaller, and specifically sport utility type to sedan type.

A user preference profile can be built based on recurrences of tags across the analyzed images, and as part of this building, user interests can be identified based on which tags are most applied by the processing to the images browsed. The higher the number of processed images, the more accurate the potential preferences and/or needs of the user will be identified. The preference profile can be used for any purpose. In some examples, it is used for further searching and recommendation by a platform, such as an e-commerce platform. Objects similar, related, complimentary, or supplemental to those viewed by the user could be recommended to the user based on the user's interests as identified from the processing herein. Additionally, as noted, the generated tags applied to an image can indicate an association between a collection of two or more of the objects recognized from the image. The user preference profile can indicate a user preference in favor of that collection of two or more objects. For instance, tags might associate one type of object, e.g. blue jeans, to another type of object, e.g. white shirts. The user preference profile could indicate a user preference that favors that collection of objects. It is understood that this association could be identified and/or strengthened based on observing this type of association across several (more than one) images.

Figure 4:
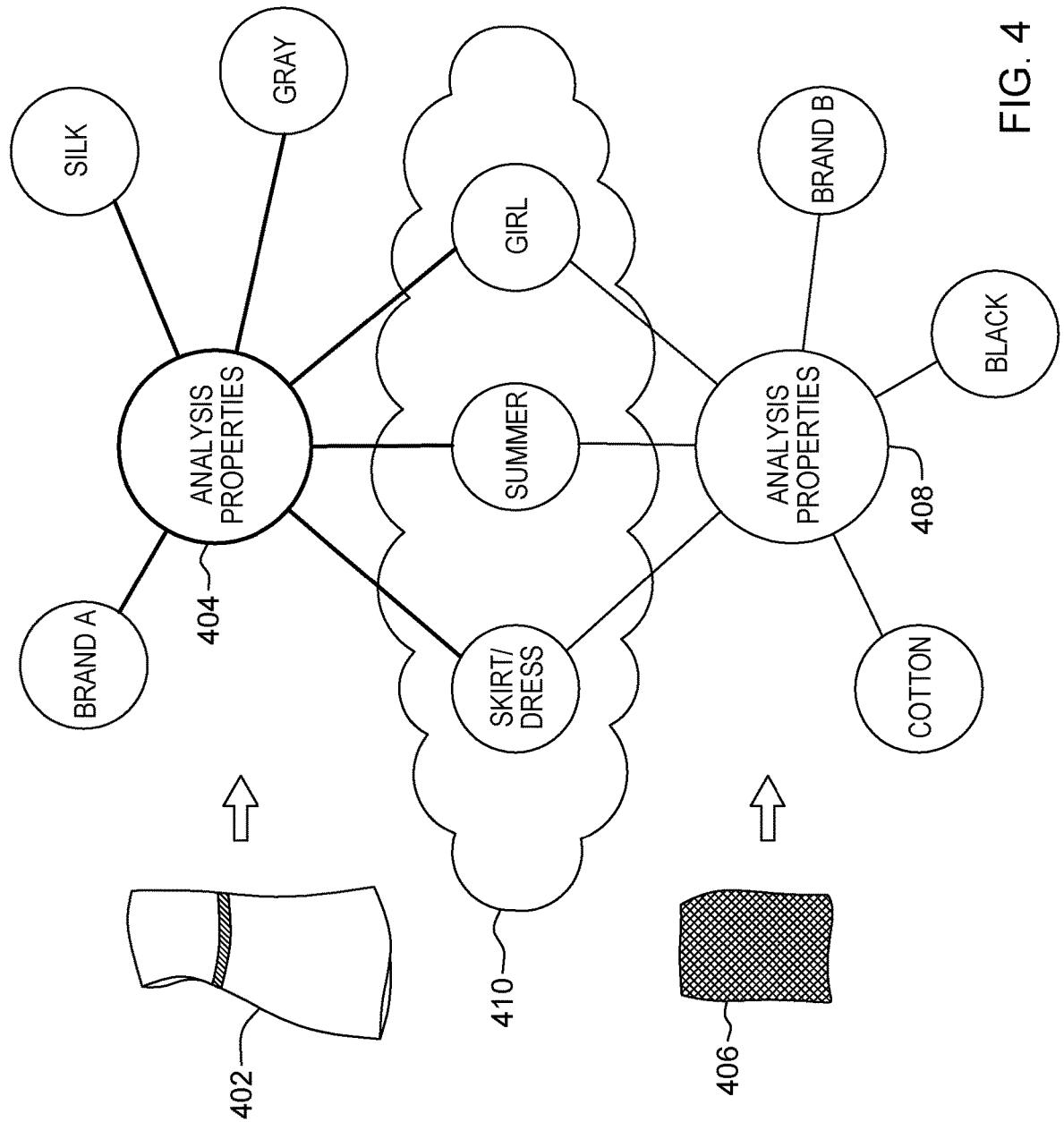
FIG. 4 depicts an example of preference analysis based on generated and applied tags, in accordance with aspects described herein.

FIG. 4 depicts an example of preference analysis based on generated and applied tags, in accordance with aspects described herein. In this example, intersections in the tags applied to images help inform user preferences. Frequency of the tag in the user's tracked data can suggest a high correlation to the user's true preferences.

FIG. 4 depicts a first image object (a dress 402) recognized from a first image. The image object was weighted above a threshold, and therefore properties analysis 404 was performed to identify properties of the dress. The properties and/or words correlated to those properties may be applied as auto-generated tags to the first image: {Brand A, Silk, Grey, Skirt/Dress, Summer, Girl}. A second image object (skirt 406) was recognized from a second image. This image object 406 was weighted above a threshold, and therefore properties analysis 408 was performed to identify the properties of the skirt. These properties and/or words correlated to these properties are applied as auto-generated tags to the second image: {Cotton, Black, Brand B, Skirt/dress, Summer, Girl}.

410 denotes the intersection in the tags applied to the images, the intersection being the tags 'Skirt/Dress', 'Summer', and 'Girl'. From these recurrences in the tags, the user preference profile can indicate that the user, a female, is interested in summer skirts and dresses.

Aspects described herein can help decrease image tagging differences across various platforms. By processing images and auto-tagging as described herein, a uniform tagging approach is delivered, as is consistent user preference profile building. Aspects also provide a more comprehensive description of images than pre-defined tags, and help build a healthy training cycle for image recognition technology. Image recognition technology is used during the auto-tagging process. This continuously builds training data including tags and assigned weights. Based on recommendations made to users, later user activity such as actual purchase decisions can be tracked and serve as feedback to evaluate whether the tags and/or weights were valid. By way of specific example, if a user profiled above purchases a white summer skirt after viewing several images of a black summer skirt, this can inform that the user preference was accurate in terms of the type of clothing but not accurate in terms of the color garment purchased. One conclusion is that color of the object may not be a significant factor in the user's decision making. To the extent that color of an object factored into the preference building (e.g. through tags and/or factor weights), this could be deemphasized in a subsequent weighting model and/or tag correlation process.

Below is a detailed example of weight calculation, in accordance with aspects described herein:

1. Select n images, with m indicators. $x_{ij}$ indicates the first image i of the first indicator j (i=1, 2, . . . , n; j=1, 2, . . . , m).

2. A normalization process of indicators, heterogeneity or homogeneity:

Positive Indicator:

$$x'_{ij} = \frac{x_{ij} - \min\{x_{ij}, \ldots, x_{nj}\}}{\max\{x_{1j}, \ldots, x_{nj}\} - \min\{x_{1j}, \ldots, x_{nj}\}}$$

Negative Indicator:

$$x'_{ij} = \frac{\max\{x_{1j}, \ldots, x_{nj}\} - x_{ij}}{\max\{x_{1j}, \ldots, x_{nj}\} - \min\{x_{1j}, \ldots, x_{nj}\}}$$

In the above, $x'_{ij}$ is the image i of the indicator j (i=1, 2, . . . , n; j=1, 2, . . . , m). For convenience, the normalized data is $x_{ij}$.

3. Calculate the indicator j under the image i of the proportion of the indicator:

$$Pij = \frac{x_{ij}}{\sum_{i=1}^{n} x_{ij}}$$

where i=1, . . . , n; j=1, . . . , m.

4. Calculate the indicator j of entropy:

$$e_j = -k \sum_{i=1}^{n} P_{ij} \ln(P_{ij})$$

while $$k = \frac{1}{\ln(n)} > 0 \quad \text{match } e_j \geq 0.$$

Accordingly, approaches described herein present a cognitive method to auto-generate and apply image tagging in a standardized manner. This can incorporate aspects of image object identification, natural language processing, and neural network analysis. Aspects can provide synchronized categorizing, searching, and intelligent recommendation facilities. This differs from existing approaches that work on recognizing predefined tags.

Figure 5A:
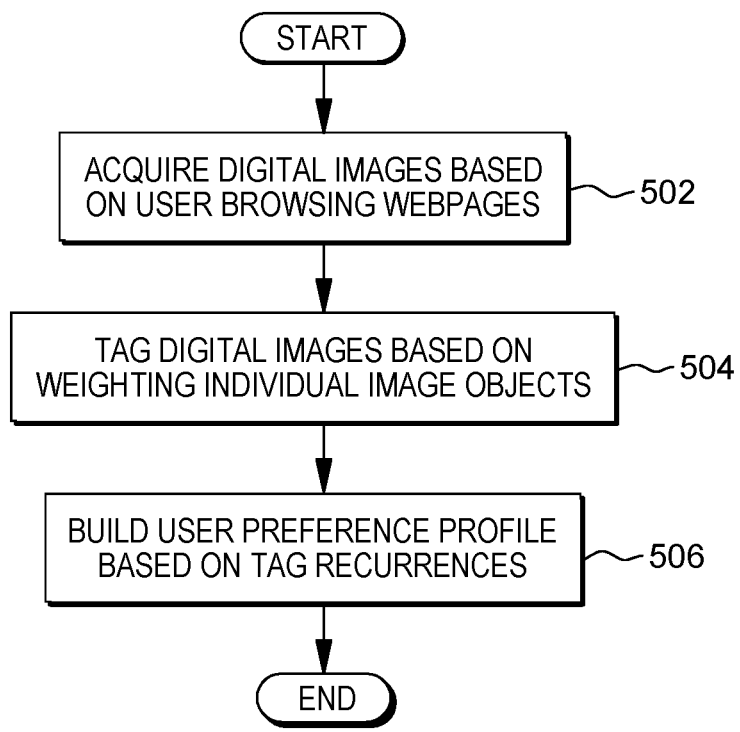
FIG. 5A depicts an example process for weighted image tagging and preference profile building, in accordance with aspects described herein.

FIG. 5A depicts an example process for weighted image tagging and preference profile building, in accordance with aspects described herein. In some examples, the process is performed by one or more computer systems, such as those described herein, which may include one or more cloud or remote computer systems, one or more user devices, and/or a combination of the foregoing. In particular examples, some aspects may be performed by user device(s), while some aspects may be performed by a remote computer system in communication with the user device and/or website server(s) with which the user device(s) communicate.

The process begins by acquiring (502) a plurality of digital images based on a user browsing webpages. The process automatically tags (504) the plurality of digital images based on weighting individual image objects. An example process for automatically tagging digital images based on weighting individual image objects is presented with reference to FIG. 5B below.

Automatically tagging a digital image is based on a relative weighting between objects recognized from that digital image. The weights of objects in an image can therefore be determined relative to each other (e.g. scale, core point, focus, etc.).

The process then builds (506) a user preference profile based on recurrences of tags across the plurality of digital images. In some examples, the process identifies the most applied tags across various images, and this informs about the user preferences. Thus, building the user preference profile can include identifying user interests based on which tags are most applied to images of the plurality of digital images.

Automatically tagging a digital image can apply to the digital image one or more generated tags other than any existing tags of the digital image (for instance tag(s) delivered with the image to the user's browser, e.g. as metadata). The one or more generated tags applied by the process of FIG. 5A can indicate an association between a collection of two or more of the objects recognized from the digital image. The user preference profile can indicate a user preference in favor of that collection of two or more objects.

Figure 5B:
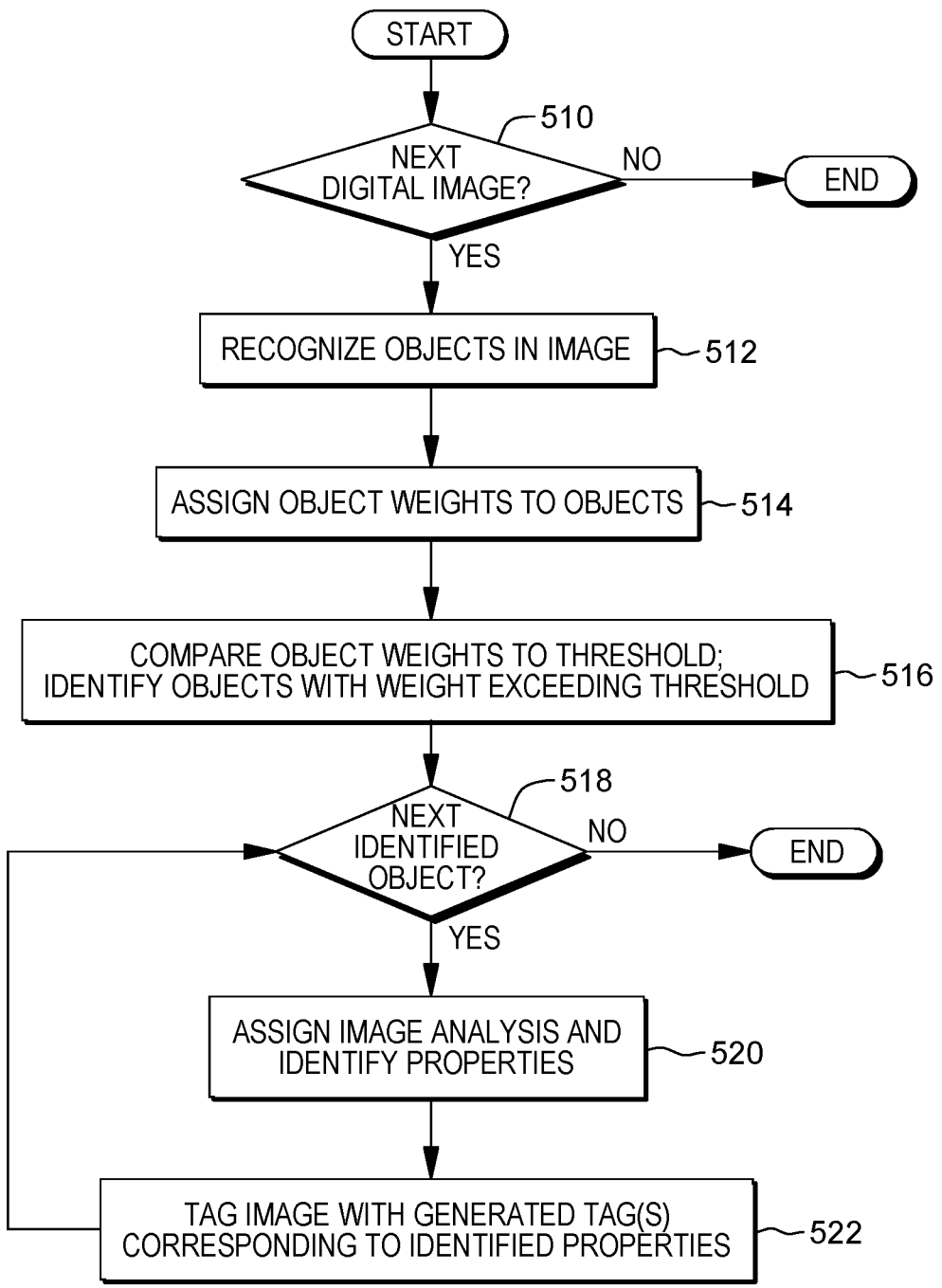
FIG. 5B depicts an example process for automatically tagging digital images based on weighting individual image objects, in accordance with aspects described herein.

FIG. 5B depicts an example process for automatically tagging digital images based on weighting individual image objects, in accordance with aspects described herein. The process is performed for each such digital image, and therefore can be performed in batch or over time as the images are browsed/viewed by the user. Generally, the process analyzes the details for each image by recognizing its objects, assigning weights to the objects, identifying any object that are weighted above a threshold, performing a detailed analysis of such object(s) weighted above the threshold, and generating the tags to apply to the image.

The process begins by determining (510) whether there is a next digital image. If not, the process ends. Otherwise, while there is a next digital image to process (510, Y), the process processes the digital image using an object recognition software/technique and recognizing (512) objects in the digital image. The process assigns (514) respective weights to the recognized objects in the digital image. The recognized objects in the digital image are weighted relative to each other. The respective weights may be a function of at least scores of the following factors, as examples: object core point, object scale, focal point, object color accuracy, and object color luminance. Each of these factors can have an associated weight. In embodiments, a neural network learning model is used in determining the associated weight for each of these factors. The neural network learning model is, for instance, trained from data that correlates user behavior to the factors across a collection of image objects, and an output of the neural network learning model includes the associated weight for each of the factors used to weight the objects of the images being processed in accordance with FIG. 5B. A weight assigned to a recognized object can be or include a weighted sum of the scores of the factors weighted by their associated weights.

The process of FIG. 5B continues by comparing (516) the respective weights assigned to the recognized objects against a threshold, and identifying one or more recognized objects for which their respective assigned weight is higher than the threshold. The process enters a loop that continues while there exists a next such identified object whose weight is above the threshold. Thus, the process determines (518) whether there is a next identified object. If so (518, Y), the process performs object image analysis (520) and identifies properties of the recognized object. The process then automatically tags (522) the digital image with one or more generated tags corresponding to the identified properties of that object. In examples, a lookup is performed for tags for those properties. The automatically tagging can therefore include generating the one or more generated tags based on a dataset that correlates objects to tags. The process returns to 518 to determine whether there is a next identified object.

Eventually there are no other identified objects to process (518, N) and the process ends.

The automatically tagging the digital image can therefore apply to the digital image one or more generated tags other than any existing tags of the digital image. The auto-generated and applied tags can therefore be new—not already pre-defined for the image. In some examples, those new tag(s) indicate that two or more objects in the image should be considered 'associated'. Accordingly, wherein the one or more generated tags can indicate an association between a collection of two or more of the objects recognized from the digital image.

As an enhancement, the process of FIG. 5A can further include recommending an object to the user based on the identified user interests. An example recommended object is an item for purchase.

Additionally or alternatively, the process of FIG. 5A can identify a trend in the user interests based on when, in connection with the user browsing the webpages, the user viewed the images with the tags most applied.

Although various examples are provided, variations are possible without departing from a spirit of the claimed aspects.

Figure 6:
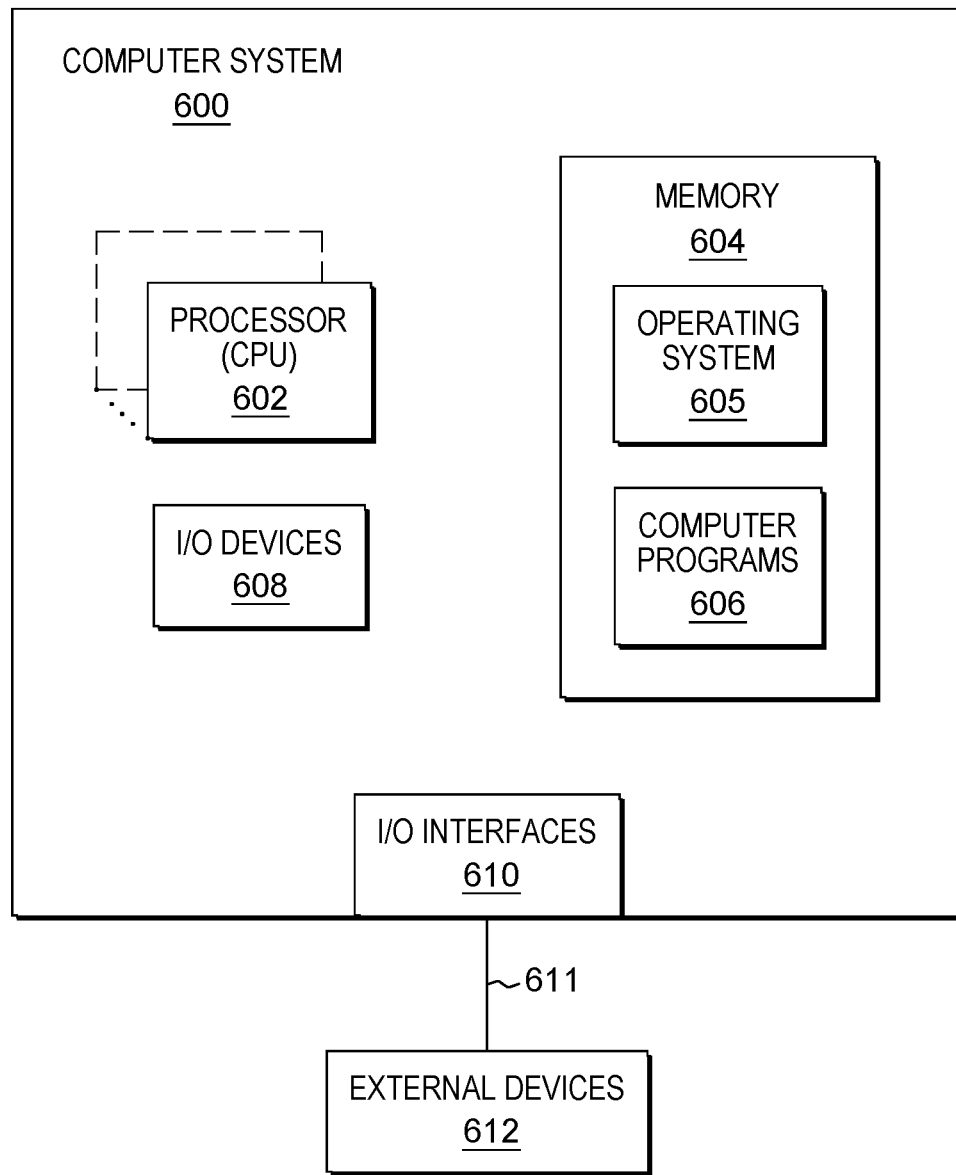
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, nearfield, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
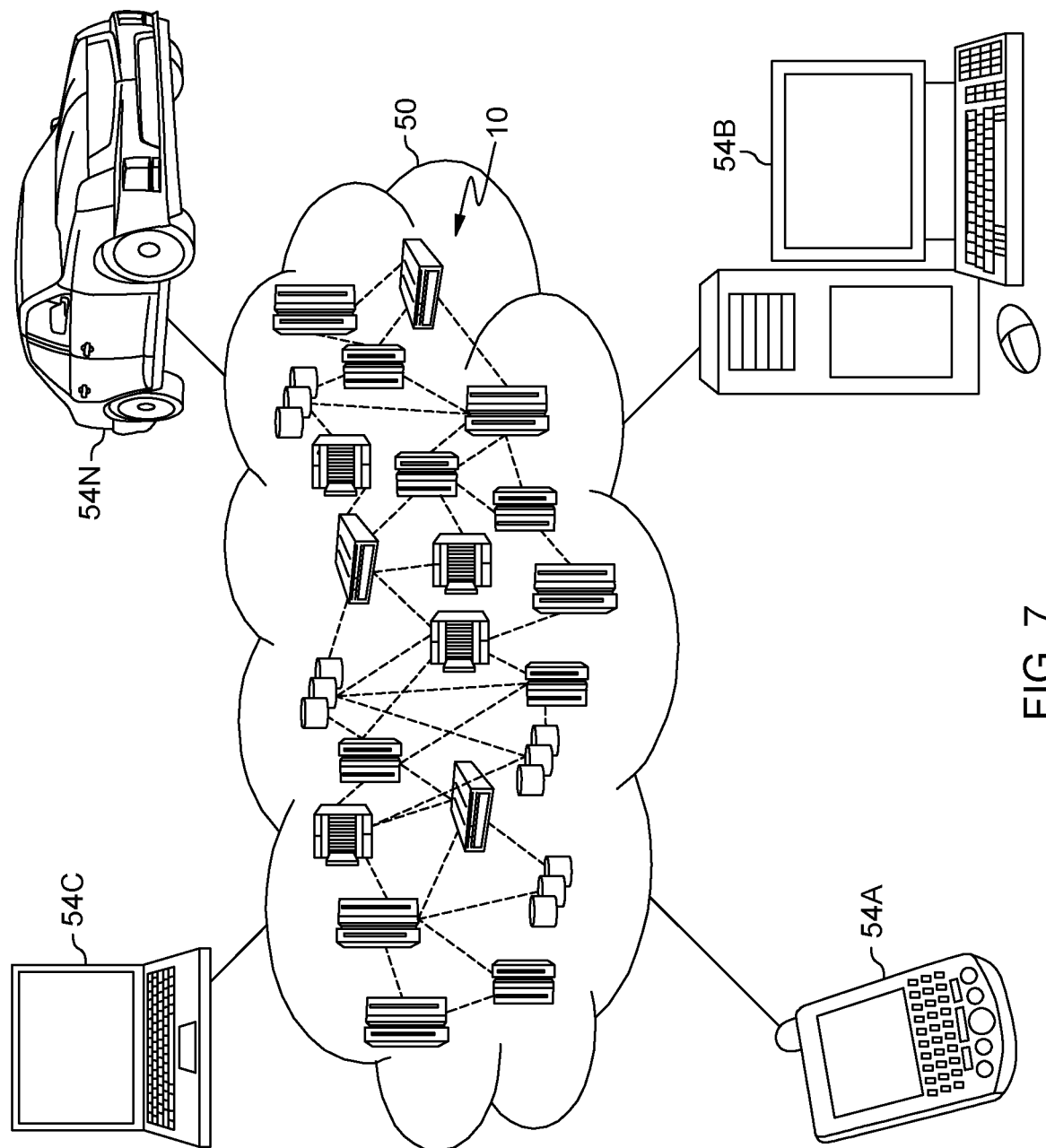
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
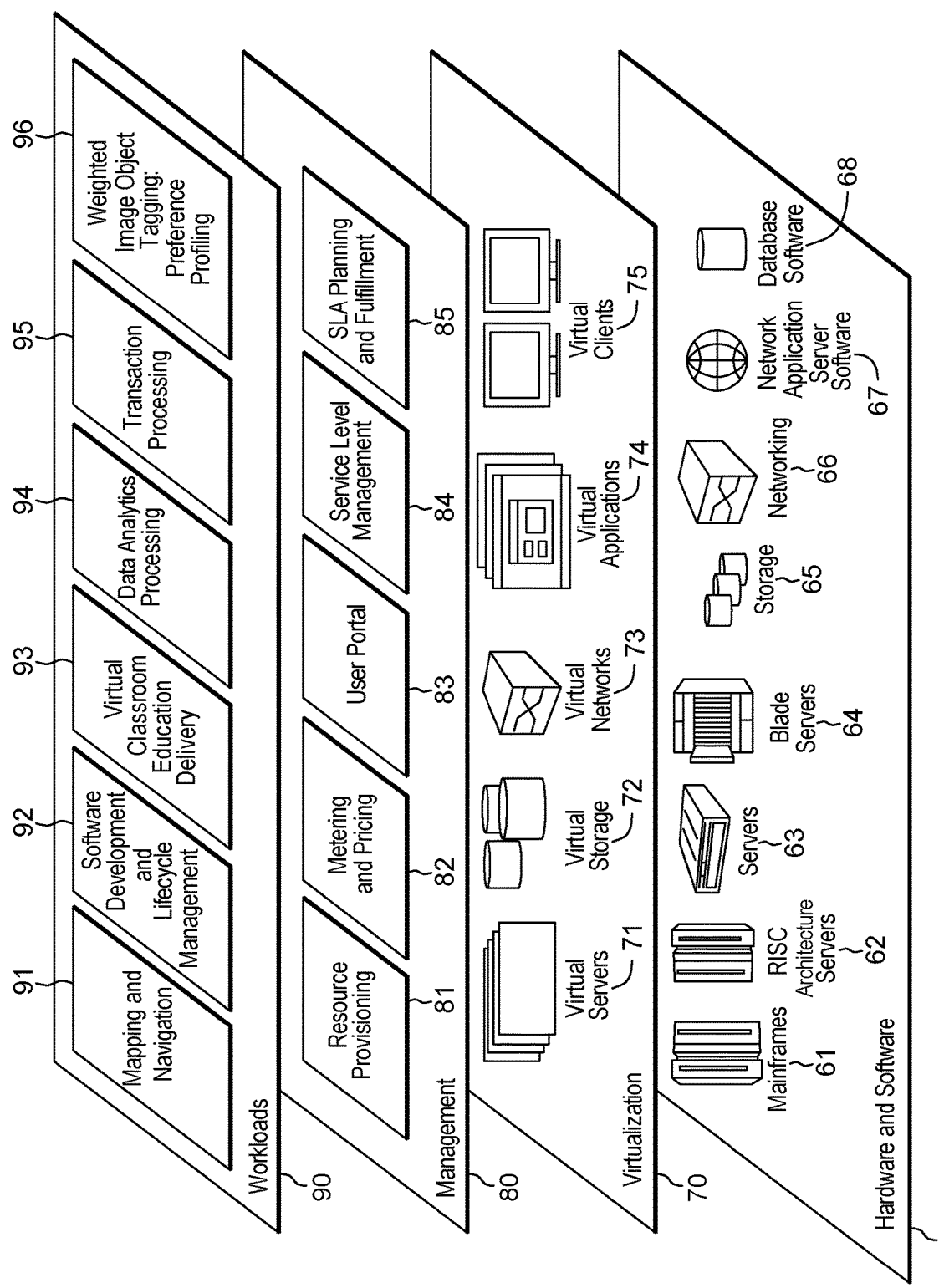
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and weighted image object tagging and user preference profiling 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
acquiring a plurality of digital images based on a user browsing webpages;
automatically tagging the plurality of digital images based on weighting individual image objects, wherein automatically tagging a digital image of the plurality of digital images is based on a relative weighting between objects recognized from that digital image; and building a user preference profile based on recurrences of tags across the plurality of digital images.

2. The method of claim 1, wherein the automatically tagging the plurality of digital images comprises, for each digital image of the plurality of digital images:
processing the digital image using object recognition software and recognizing objects in the digital image;
assigning respective weights to the recognized objects in the digital image, wherein the recognized objects in the digital image are weighted relative to each other;
comparing the respective weights assigned to the recognized objects against a threshold and identifying one or more recognized objects for which their respective assigned weight is higher than the threshold;
for each of the identified one or more recognized objects, performing object image analysis and identifying properties of the recognized object; and
automatically tagging the digital image with one or more generated tags corresponding to the identified properties of each of the identified one or more recognized objects.

3. The method of claim 2, wherein the respective weights assigned to the recognized objects in the digital image are a function of at least scores of factors, each factor of the factors having an associated weight.

4. The method of claim 3, wherein the factors include object core point, object scale, focal point, object color accuracy, and object color luminance.

5. The method of claim 3, further comprising determining, using a neural network learning model, the associated weight for each factor of the factors, the neural network learning model trained from data that correlates user behavior to the factors across a collection of image objects, wherein an output of the neural network learning model comprises the associated weight for each factor of the factors.

6. The method of claim 3, wherein the respective weight assigned to a recognized object comprises a weighted sum of the scores of the factors weighted by their associated weights.

7. The method of claim 2, wherein the automatically tagging the digital image with the one or more generated tags comprises generating the one or more generated tags based on a dataset that correlates objects to tags.

8. The method of claim 1, wherein building the user preference profile comprises identifying user interests based on which tags are most applied to images of the plurality of digital images.

9. The method of claim 8, further comprising sending an electronic communication recommending an object to the user based on the identified user interests.

10. The method of claim 8, further comprising identifying a trend in the user interests based on when, in connection with the user browsing the webpages, the user viewed the images with the tags most applied.

11. The method of claim 1, wherein the automatically tagging the digital image applies to the digital image one or more generated tags other than any existing tags of the digital image, wherein the one or more generated tags indicate an association between a collection of two or more of the objects recognized from the digital image, and wherein the user preference profile indicates a user preference in favor of that collection of two or more objects.

12. A computer system comprising:
a memory; and
a processor in communication with the memory, wherein the computer system is configured to perform a method comprising:
acquiring a plurality of digital images based on a user browsing webpages;
automatically tagging the plurality of digital images based on weighting individual image objects, wherein automatically tagging a digital image of the plurality of digital images is based on a relative weighting between objects recognized from that digital image; and
building a user preference profile based on recurrences of tags across the plurality of digital images.

13. The computer system of claim 12, wherein the automatically tagging the plurality of digital images comprises, for each digital image of the plurality of digital images:
processing the digital image using object recognition software and recognizing objects in the digital image;
assigning respective weights to the recognized objects in the digital image, wherein the recognized objects in the digital image are weighted relative to each other;
comparing the respective weights assigned to the recognized objects against a threshold and identifying one or more recognized objects for which their respective assigned weight is higher than the threshold;
for each of the identified one or more recognized objects, performing object image analysis and identifying properties of the recognized object; and
automatically tagging the digital image with one or more generated tags corresponding to the identified properties of each of the identified one or more recognized objects.

14. The computer system of claim 13, wherein the respective weights assigned to the recognized objects in the digital image are a function of at least scores of factors, each factor of the factors having an associated weight, wherein the respective weight assigned to a recognized object comprises a weighted sum of the scores of the factors weighted by their associated weights, and wherein the method further comprises determining, using a neural network learning model, the associated weight for each factor of the factors, the neural network learning model trained from data that correlates user behavior to the factors across a collection of image objects, wherein an output of the neural network learning model comprises the associated weight for each factor of the factors.

15. The computer system of claim 12, wherein building the user preference profile comprises identifying user interests based on which tags are most applied to images of the plurality of digital images, and wherein the method further comprises sending an electronic communication recommending an object to the user based on the identified user interests.

16. The computer system of claim 12, wherein the automatically tagging the digital image applies to the digital image one or more generated tags other than any existing tags of the digital image, wherein the one or more generated tags indicate an association between a collection of two or more of the objects recognized from the digital image, and wherein the user preference profile indicates a user preference in favor of that collection of two or more objects.

17. A computer program product comprising:
a computer readable storage medium readable by a processing circuit and storing instructions for execution by the processing circuit for performing a method comprising:

acquiring a plurality of digital images based on a user browsing webpages;

automatically tagging the plurality of digital images based on weighting individual image objects, wherein automatically tagging a digital image of the plurality of digital images is based on a relative weighting between objects recognized from that digital image; and building a user preference profile based on recurrences of tags across the plurality of digital images.

18. The computer program product of claim 17, wherein the automatically tagging the plurality of digital images comprises, for each digital image of the plurality of digital images:

processing the digital image using object recognition software and recognizing objects in the digital image;

assigning respective weights to the recognized objects in the digital image, wherein the recognized objects in the digital image are weighted relative to each other, and wherein the respective weights assigned to the recognized objects in the digital image are a function of at least scores of factors, each factor of the factors having an associated weight, and the respective weight assigned to a recognized object comprises a weighted sum of the scores of the factors weighted by their associated weights;

comparing the respective weights assigned to the recognized objects against a threshold and identifying one or more recognized objects for which their respective assigned weight is higher than the threshold;

for each of the identified one or more recognized objects, performing object image analysis and identifying properties of the recognized object; and automatically tagging the digital image with one or more generated tags corresponding to the identified properties of each of the identified one or more recognized objects.

19. The computer program product of claim 18, wherein building the user preference profile comprises identifying user interests based on which tags are most applied to images of the plurality of digital images, and wherein the method further comprises sending an electronic communication recommending an object to the user based on the identified user interests.

20. The computer program product of claim 17, wherein the automatically tagging the digital image applies to the digital image one or more generated tags other than any existing tags of the digital image, wherein the one or more generated tags indicate an association between a collection of two or more of the objects recognized from the digital image, and wherein the user preference profile indicates a user preference in favor of that collection of two or more objects.

* * * * *